US008401780B2

United States Patent
Grün (10) Patent No.: US 8,401,780 B2
(45) Date of Patent: Mar. 19, 2013

(54) METHOD OF PRIORITIZING SIMILAR NAMES OF LOCATIONS FOR USE BY A NAVIGATION SYSTEM

(75) Inventor: Raimund Grün, Eschborn (DE)

(73) Assignee: Navteq B.V., Veldhoven (NL)

( * ) Notice: Subject to any disclaimer, the term of this patent is extended or adjusted under 35 U.S.C. 154(b) by 1011 days.

(21) Appl. No.: 12/015,603

(22) Filed: Jan. 17, 2008

(65) Prior Publication Data
US 2009/0187538 A1 Jul. 23, 2009

(51) Int. Cl.
*G01C 21/26* (2006.01)

(52) U.S. Cl. .......... 701/200; 701/26; 701/400; 701/409; 701/410; 701/424; 701/438; 701/445; 701/447; 701/467; 701/468; 340/995.1; 340/995.14; 340/995.19; 340/995.23

(58) Field of Classification Search .................. 701/300, 701/200–215; 340/988–996
See application file for complete search history.

(56) References Cited

U.S. PATENT DOCUMENTS

| | | | | |
|---|---|---|---|---|
| 5,072,395 A * | 12/1991 | Bliss et al. | ..... | 701/538 |
| 5,819,200 A * | 10/1998 | Tamai et al. | ..... | 701/400 |
| 5,968,109 A * | 10/1999 | Israni et al. | ..... | 701/532 |
| 6,088,649 A * | 7/2000 | Kadaba et al. | ..... | 701/538 |
| 6,112,153 A * | 8/2000 | Schaaf et al. | ..... | 701/532 |
| 6,112,174 A | 8/2000 | Wakisaka et al. | ..... | 704/251 |
| 6,259,987 B1 * | 7/2001 | Ceylan et al. | ..... | 701/532 |
| 6,415,227 B1 * | 7/2002 | Lin | ..... | 701/455 |
| 6,424,908 B2 * | 7/2002 | Urban et al. | ..... | 701/538 |
| 6,836,822 B1 | 12/2004 | Hatano et al. | ..... | 711/117 |
| 6,947,834 B2 * | 9/2005 | Duckeck | ..... | 701/201 |
| 7,218,246 B2 * | 5/2007 | Chiba | ..... | 340/990 |
| 7,236,924 B2 | 6/2007 | Ehrke | ..... | 704/10 |
| 7,328,155 B2 * | 2/2008 | Endo et al. | ..... | 704/251 |
| 7,624,011 B2 * | 11/2009 | Fukada | ..... | 704/240 |
| 7,664,597 B2 * | 2/2010 | Imanishi | ..... | 701/424 |
| 7,702,458 B2 * | 4/2010 | Yokota et al. | ..... | 701/437 |
| 7,805,317 B2 * | 9/2010 | Khan et al. | ..... | 705/1.1 |
| 7,894,986 B2 * | 2/2011 | Hegedus et al. | ..... | 701/426 |
| 2002/0016669 A1 * | 2/2002 | Ruhl | ..... | 701/207 |
| 2002/0111810 A1 * | 8/2002 | Khan et al. | ..... | 704/275 |
| 2004/0010365 A1 * | 1/2004 | Duckeck | ..... | 701/201 |
| 2004/0204833 A1 * | 10/2004 | Yokota | ..... | 701/208 |

(Continued)

FOREIGN PATENT DOCUMENTS

| | | |
|---|---|---|
| EP | 1 832 845 | 9/2007 |
| EP | 1832845 | 9/2007 |

(Continued)

OTHER PUBLICATIONS

EPA Serial No. 08254009.7, European Extended Search Report, dated Dec. 1, 2011.

(Continued)

*Primary Examiner* — Jonathan M Dager (57) ABSTRACT

Locations having similar names are identified and placed in groups. The naming similarity includes how names or portions of names are spelled and/or pronounced. The names within the groups are then ranked by priority. The ranking is calculated using one or more attributes in a geographic database, such as the number of road segments associated with a named location, the population associated with a named location, distance to a named location, and administrative level of a named location. The ranking may be used during destination entry, when providing route guidance and/or maps, and when providing additional information to a user of a navigation system, such as demographic information.

17 Claims, 6 Drawing Sheets

U.S. PATENT DOCUMENTS

| | | | |
|---|---|---|---|
| 2005/0080632 A1* | 4/2005 | Endo et al. | 704/277 |
| 2005/0182559 A1 | 8/2005 | Listle et al. | 701/200 |
| 2006/0015246 A1* | 1/2006 | Hui | 701/201 |
| 2006/0100999 A1* | 5/2006 | Sencaj et al. | 707/3 |
| 2006/0200359 A1 | 9/2006 | Khan et al. | 705/1 |
| 2006/0224312 A1* | 10/2006 | Imanishi | 701/209 |
| 2006/0248224 A1* | 11/2006 | Belhoula et al. | 709/238 |
| 2007/0124057 A1* | 5/2007 | Prieto et al. | 701/200 |
| 2007/0156331 A1* | 7/2007 | Terada et al. | 701/208 |
| 2007/0162284 A1* | 7/2007 | Otani | 704/260 |
| 2007/0219799 A1* | 9/2007 | Ozkaragoz et al. | 704/260 |
| 2007/0276586 A1* | 11/2007 | Jeon et al. | 701/200 |
| 2007/0276845 A1* | 11/2007 | Geilich | 707/100 |
| 2008/0059175 A1* | 3/2008 | Miyajima | 704/246 |
| 2008/0221891 A1* | 9/2008 | Konig et al. | 704/252 |
| 2009/0150156 A1* | 6/2009 | Kennewick et al. | 704/257 |

FOREIGN PATENT DOCUMENTS

| | | |
|---|---|---|
| EP | 2 075 547 | 7/2009 |
| EP | 2075547 | 7/2009 |
| WO | WO 01/69178 | 9/2001 |
| WO | WO 03/100351 | 12/2003 |

OTHER PUBLICATIONS

Extended European Search Report, dated Dec. 1, 2011, European Application No. 08254009.7.

Office Action in corresponding European Patent Application No. EP 08 254 009.7, dated Jan. 2, 2013, 4 pages.

* cited by examiner

METHOD OF PRIORITIZING SIMILAR NAMES OF LOCATIONS FOR USE BY A NAVIGATION SYSTEM

FIELD

The present invention relates to ways of prioritizing locations having a similar name and, more particularly, the present invention relates to automatically defining the significance of a named place for use with an application in a navigation system or other computing platform.

BACKGROUND

Navigation-related functions are provided on various different computer platforms. For example, navigation-related functions can be provided with standalone systems or networked systems. In a standalone system, the software applications, geographic data, and hardware are combined at a single location. A standalone system may be installed in a vehicle or carried by a person. In a networked system, some of the software or geographic data are located with the hardware with the user and some of the software or geographic data are located remotely and accessed over a communications system.

Navigation-related functions are provided by systems implemented on dedicated platforms in which the hardware and software are specifically designed for navigation purposes. Alternatively, systems that provide navigation-related features can be implemented on general purpose computing platforms (such as personal computers, personal digital assistants, or networked computers) using appropriate software applications and data. Dedicated navigation systems and general purpose computing platforms that run navigation applications (hereinafter referred to collectively as "navigation systems") provide a variety of useful features and services. For example, navigation systems used in vehicles can provide detailed instructions for driving to desired destinations, thereby reducing travel times and expenses. Navigation systems and navigation applications can also search for businesses of a desired type and provide routing guidance to locations of such businesses.

One consideration associated with these systems relates to how places are specified to the system by a user. For example, when a user wishes to obtain guidance from a navigation system for following a route to a destination, it is necessary that the user indicate, by some means, the destination to the system. The function of specifying a destination can be complicated for various reasons. One complication occurs when cities or other destinations have the same or similar names. For example, the city of Arlington is found in Alabama, Arizona, Colorado, Georgia, Illinois, Indiana, Iowa, Kansas, Kentucky, Minnesota, Nebraska, North Carolina, Ohio, Oregon, South Dakota, Tennessee, Texas, Vermont, Virginia, Washington, and Wisconsin.

To simplify the destination entry process, lists are manually prepared to prioritize similar names for cities or other destinations. For example, the manually prepared list of city names that include the name "Chicago" lists Chicago first, followed by Chicago Heights and Chicago Ridge, as it is expected that a person that specifies Chicago as a destination most likely desires guidance to the city of Chicago. When a user of a navigation system specifies "Chicago" as a destination, the navigation system displays the manually prepared list to the user for destination selection.

As there are many similar names that may be used in a destination entry process, it would be beneficial to automatically generate rankings that prioritize the similarly named locations.

SUMMARY

To address these and other objectives, the present invention includes embodiments for organizing digital map data to enable fast and convenient destination entry and guidance for navigation systems. Locations having the same or similar names, or the same or similarly sounding names, are identified and placed in groups. The groups are then ranked by priority. The ranking is calculated based on one or more attributes in a geographic database used by the navigation system, such as the number of roads associated with the named place, the population associated with the named place, distance to the named place, and administrative level of the named place. The ranking may be used during destination entry, when providing route guidance and/or maps, and when providing additional information to a user of a navigation system, such as demographic information.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

I. Overview of Geographic Database Formation

Figure 1:
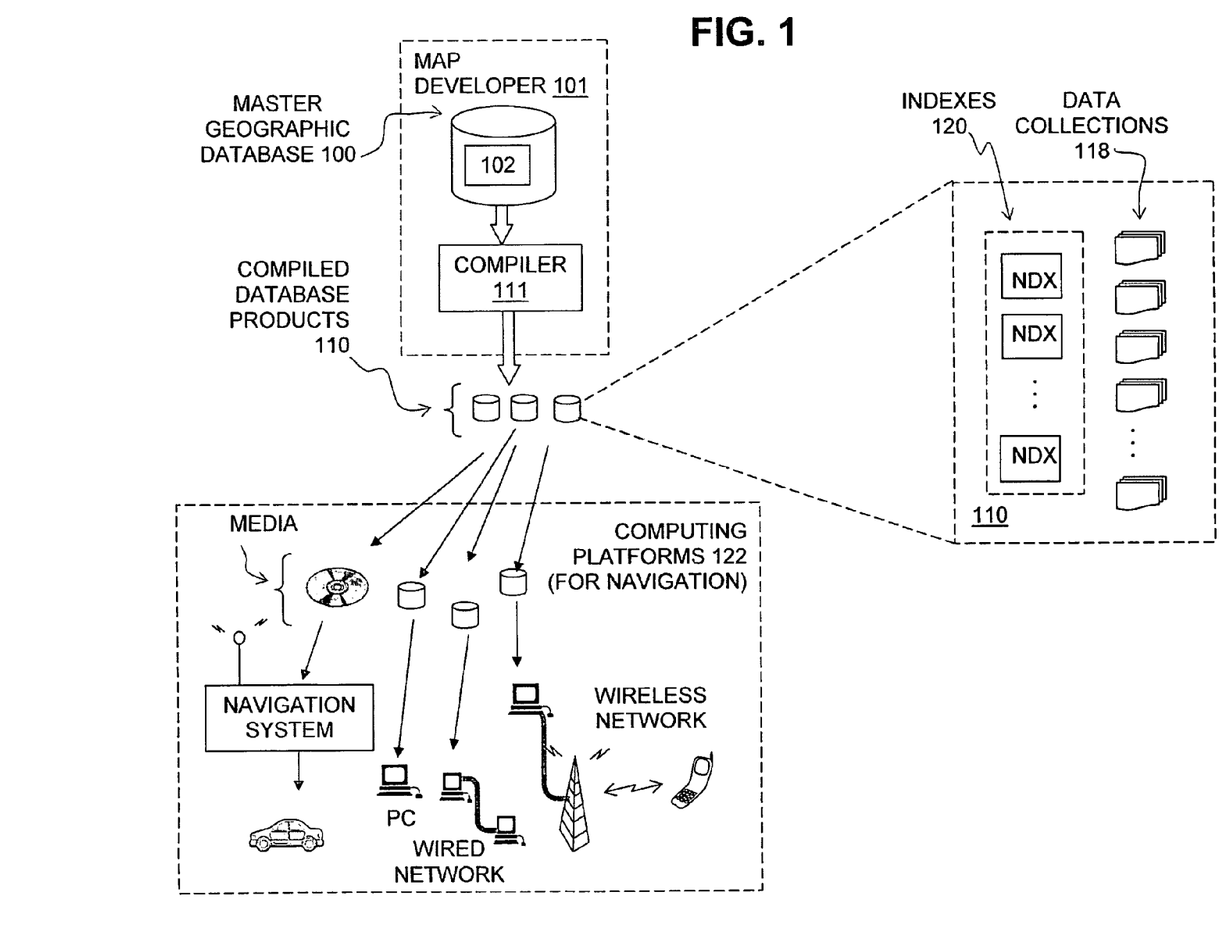
FIG. 1 is an illustration of a process for forming and delivering geographic database products for use in various computing platforms, according to an example.

FIG. 1 shows a master or source version of a geographic database 100. The master version of the geographic database 100 is owned and developed by a geographic database developer 101 (also referred to as a "map developer," a "map data developer," or the like). Although only one geographic database and geographic database developer are shown, the embodiments disclosed herein are not limited to only a single geographic database or a single geographic database developer.

The master version of the geographic database 100 contains data 102 (sometimes referred to as "geographic data" or "spatial data") that represent features in a geographic coverage area. The geographic coverage area may correspond to an entire country, such as the United States. Alternatively, the geographic coverage area may correspond to several countries, such as the United States, Canada, and Mexico; France, Germany, and Italy; and so on. According to another alternative, the geographic coverage area of the master version of the geographic database 100 may represent only a single region within a country, such as the West Coast or the Midwest region of the United States. Although the master version of the geographic database 100 includes data that represent geographic features in the entire geographic coverage area, there may be parts of the geographic coverage area that contain geographic features that are not represented by data in the geographic database or for which the representation of geographic features is sparse.

The master version of the geographic database 100 may include data identifying an administrative level assigned to a geographic area. The geographic areas include country, state, county, city, municipality, suburb, and other types of regions. Each area-type is assigned an administrative level code, which preferably includes an alphanumeric character. Using numerals as an example, all countries may be assigned the administrative level code of "1," all states may be assigned the administrative level code of "2," all counties may be assigned the administrative level code of "3," and so on.

Additionally, the master version of the geographic database 100 includes data about a road network located in the geographic coverage area. The data about the road network include various kinds of information, such as the geographic coordinates of positions of the roads, street names of the roads, addresses ranges along the roads, turn restrictions at intersections of roads, and so on.

The master version of the geographic database 100 also includes data about points of interest in the covered geographic area. Points of interest may include hotels, restaurants, museums, stadiums, offices, automobile dealerships, auto repair shops, etc. The master version of the geographic database 100 may include data about the locations of these points of interests.

The master version of the geographic database 100 may also include data about places, such as cities, towns, or other communities, and other geographic features, such as bodies of water, mountain ranges, etc. The master version of the geographic database 100 may include other kinds of information, such as the population or other demographic information regarding a city, town, or other community.

The data 102 in the master version of the geographic database 100 is further described with reference to FIGS. 2 and 3.

Figure 2:
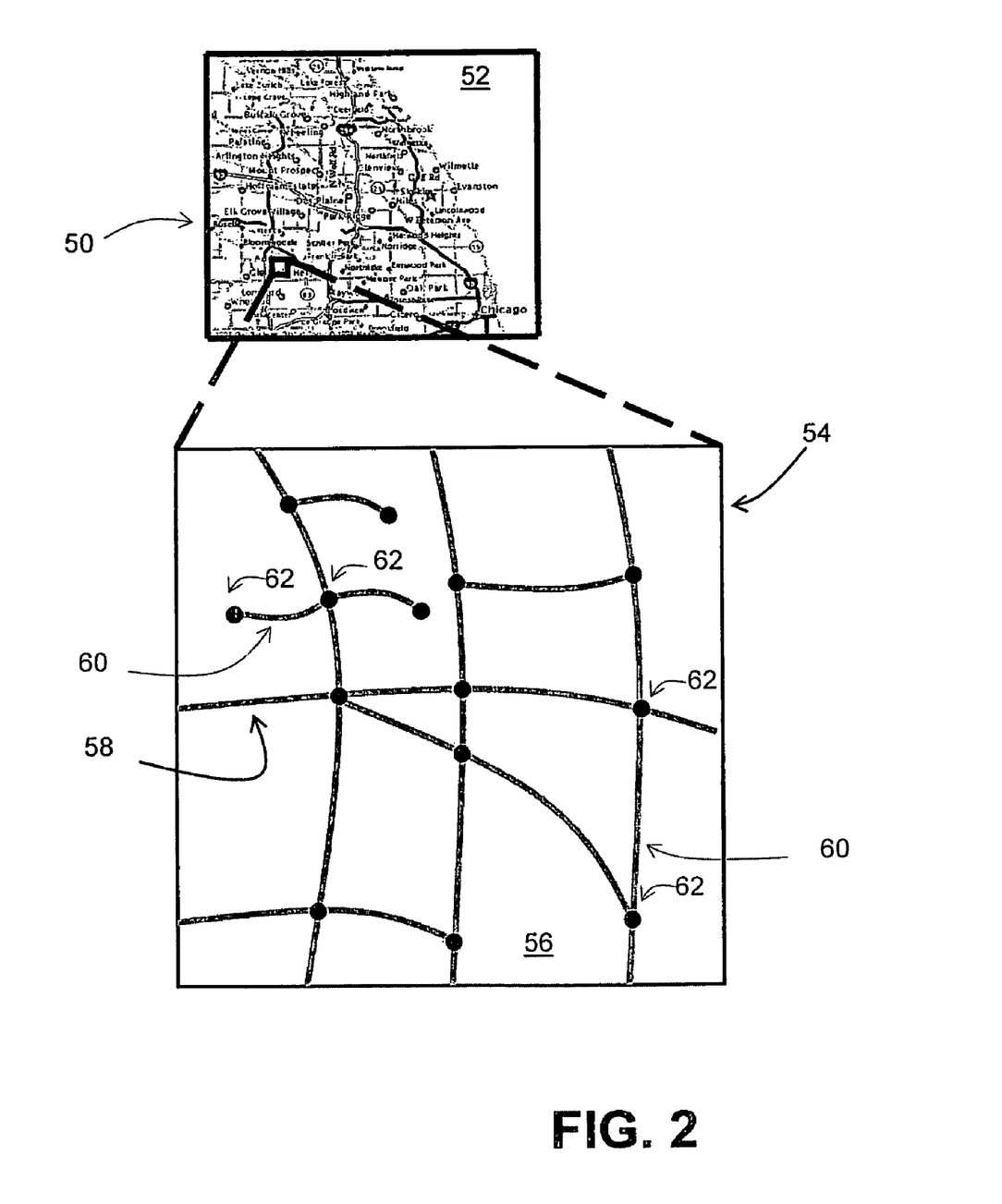
FIG. 2 shows a map of a geographic region, according to an example.

FIG. 2 shows a map 50 of a geographic region 52. The geographic region 52 may correspond to a metropolitan or rural area, a state, a country, or combinations thereof, or any other area of comparable size. Located in the geographic region 52 are physical geographic features, such as roads, points of interest (including businesses, facilities, etc.), lakes, rivers, railroads, municipalities, etc.

FIG. 2 also includes an enlarged map 54 of a portion 56 of the geographic region 52. The enlarged map 54 illustrates part of the road network 58 in the geographic region 52. The road network 58 includes, among other things, roads and intersections located in the geographic region 52. For purpose of representing the road network as data 102 in the geographic database 100 in FIG. 1, each road in the geographic region 52 is composed of one or more road segments 60. A road segment 60 represents a portion of the road. Each road segment 60 is shown to have associated with it two nodes 62; one node represents the point at one end of the road segment and the other node represents the point at the other end of the road segment. The node at either end of a road segment may correspond to a location at which the road meets another road, i.e., an intersection, or where the road dead-ends.

Figure 3:
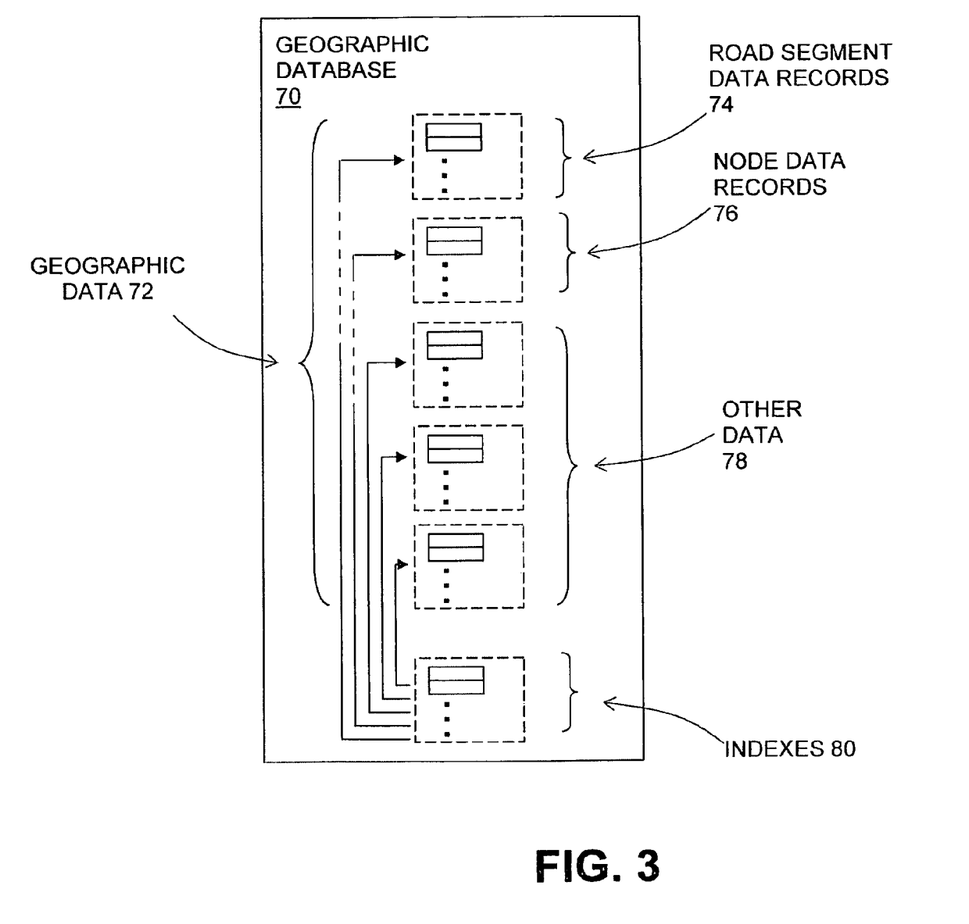
FIG. 3 is a block diagram of a geographic database that represents the geographic region of FIG. 2, according to an example.

FIG. 3 depicts a geographic database 70 that represents the geographic region 52 depicted in FIG. 2. The geographic database 70 is substantially the same as the master version of the geographic database 100 depicted in FIG. 1. The geographic database 70 contains data 72 that represents some of the physical geographic features in the geographic region 52.

The data 72 contained in the geographic database 70 includes data that represent the road network 58. The geographic database 70 that represents the geographic region 52 contains at least one database record 74 (also referred to as "entity" or "entry") for each road segment 60 in the geographic region 52 in FIG. 2. The road segment data record 74 may include a segment ID by which the data record can be identified in the geographic database 70.

Each road segment data record 74 has associated with it information (such as "attributes," "fields," etc.) that describes features of the represented road segment. The road segment data record 74 may include data that indicate the restrictions, if any, on the direction of vehicular travel permitted on the represented road segment, data indicating a speed limit or speed category (i.e., the maximum permitted vehicular speed of travel) on the represented road segment, data indicating whether the represented road segment is part of a controlled access road (such as an expressway), a ramp to a controlled access road, a bridge, a tunnel, a toll road, a ferry, and so on.

The road segment data record 74 also includes data providing the geographic coordinates (e.g., the latitude and longitude) of the endpoints of the represented road segment and data providing the shape of the road segment. In one embodiment, the endpoint data are references to the node data records 76 that represent the nodes corresponding to the endpoints of the represented road segment.

The road segment data record 74 may also include or be associated with other data that refer to various other attributes of the represented road segment. The various attributes associated with a road segment may be included in a single road segment record, or may be included in more than one type of record that are cross-referenced to each other. For example, the road segment data record 74 may include data identifying what turn restrictions exist at each of the nodes that correspond to intersections at the ends of the road portion represented by the road segment, the name or names by which the represented road segment is known, the street address ranges along the represented road segment, and so on.

The geographic database 70 that represents the geographic region 52 also includes a database record 76 (or "entity" or "entry") for each node 62 in the geographic region 52. Each of the node data records 76 may have associated information (such as "attributes," "fields," etc.) that allows identification of the road segment(s) that connect to it and/or its geographic position (e.g., its latitude and longitude coordinates). The terms "nodes" and "segments" represent only one terminology for describing these physical geographic features and other terminology for describing these features is intended to be encompassed within the scope of these concepts.

The geographic database 70 may also include other kinds of data 78. The other kinds of data 78 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. Each point of interest has a unique physical location and each of the locations can be identified by its two dimensional (or three dimensional) geographic coordinates, (i.e., latitude, longitude, and optionally altitude). Additionally, the locations may correspond to one of the nodes or may correspond to a point along a road segment.

The other kinds of data 78 may include regional data. The regional data may include an administrative level assigned to a geographic area identified in the geographic database 70. The geographic area may be assigned an administrative level code for a country, city, or suburb, for example. The regional data may also include population data for the region. The regional data may also include other data, such as additional demographic data for the region.

The geographic database 70 also includes indexes 80. The indexes 80 may include various types of indexes that relate the different types of data to each other or that relate to other aspects of the data contained in the geographic database 70.

Returning to FIG. 1, the master version of the geographic database 100 is maintained as the copy that has the most up-to-date data relating to the geographic coverage area. Accordingly, the master version of the geographic database 100 is updated, expanded, and/or otherwise modified on a regular and continuing basis. To facilitate these operations, the master version of the geographic database 100 is stored in a format that facilitates updating, maintenance, and development. While any suitable format of the master version of the geographic database 100 may be used, the format is typically not suitable for use in navigation systems. For example, the data in the master version 100 may be uncompressed.

In one embodiment, the master version of the geographic database 100 is stored at a location on one or more hard drives, tapes, or other media, and accessed with any appropriate computer. Any suitable computer may be used, such as a mainframe computer, a plurality of networked microcomputers, and so on.

Data from the master version of the geographic database 100 is used to make compiled database products 110. The compiled database products 110 are made using a compiler 111. The compiler 111 is a software program run on an appropriate computer platform. The compiled database products 110 may be produced by the geographic database developer 101 or by another entity, such as a customer of the geographic database developer 101 who acquires or licenses data from the geographic database developer 101.

Prior to production of the compiled database products 110, data from the master version of the geographic database 100 may be compiled or delivered into one or more intermediate or extraction formats, such as the Geographic Data Format (GDF). The compiled database products 110 may also be stored in a compressed format on the media on which it is located.

The compiled database products 110 may include only portions of all the data in the master version of the geographic database 100. For example, the compiled database products 110 may include data that relate to only one or more specific sub-areas within the coverage area of the master version of the geographic database 100. Further, the compiled database products 110 may include fewer than all the data attributes that describe geographic features represented in the master version of the geographic database 100.

In the compiled database products 110, the geographic data are organized differently than in the master version of the geographic database 100. A compiled database product 110 is organized, arranged, structured, and stored in a form that facilitates the use of the data in the computing platform in which it is installed. As an example, in a compiled database product 110, the data may be organized into separate collections 118 of data each of which includes only those attributes needed to perform a specific function. For example, one collection of data may include only those attributes needed to perform route calculation, another of the collections may include only those attributes needed for positioning, while still another of the collections includes only those attributes needed for destination selection.

The compiled database product 110 may also include collections of the geographic data in different levels or scales. For example, one collection of data may include all the roads in a coverage area and another collection of data in the same database may include only higher function class roads, i.e., roads that can carry relatively higher volumes of traffic, such as controlled access roads.

The compiled database product 110 may also organize some of the collections of data spatially, i.e., so that geographic features that are close together physically are represented by data that are located close together in the database.

The compiled database product 110 may include data entities that are not found in the master geographic database 100. For example, the compiled database product 110 may include data entities that are composites of several different data entities in the master geographic database 100 or that are derived from data entities in the master geographic database 100.

The compiled database products 110 may also include one or more indexes 120. Various types of indexes 120 may be included, including indexes that relate the various collections of data to each other, indexes for finding data on the medium on which it is stored, and indexes for finding specific information within the collections of data.

II. Use of Geographic Data in Computing Platforms

The compiled database products 110 are used on various kinds of computing platforms 122. The computing platforms 122 include in-vehicle navigation systems, hand-held portable navigation systems, personal computers (including desktop and notebook computers), and other kinds of devices, such as personal digital assistant (PDA) devices, pagers, telephones, etc. The compiled database products 110 are also used on networked computing platforms and environments, including systems connected to the Internet.

The compiled database products 110 that are used in the computing platforms 122 are stored on suitable media. For example, the compiled database products may be stored on CD-ROM disks, hard drives, DVD disks, flash memory, memory cards, or other types of media that are available now or that become available in the future.

On the computing platforms 122, the compiled database products 110 are used by various software applications. For example, the compiled database products 110 may be used by software applications that provide navigation-related functions, such as route calculation, route guidance, vehicle positioning, map display, and electronic yellow pages, as well as other kinds of functions.

Figure 4:
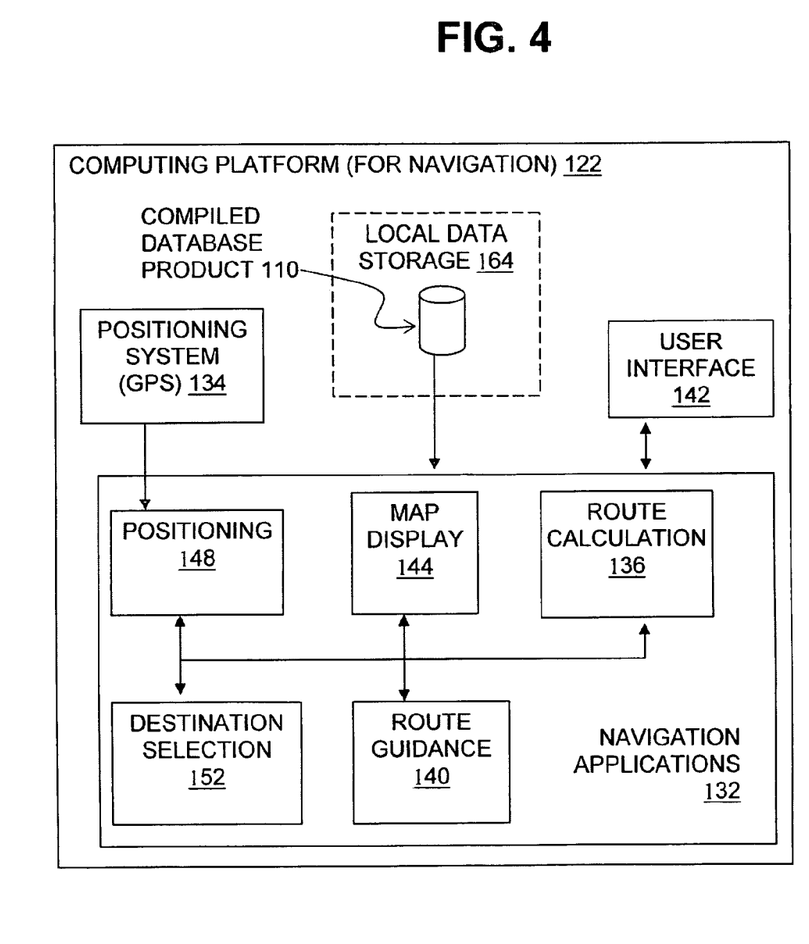
FIG. 4 is a block diagram of one of the computing platforms depicted in FIG. 1 that use a geographic database product, according to an example.

FIG. 4 shows a block diagram of some of the components of the computing platform 122. The computing platform 122 includes a positioning system 134. The positioning system 134 determines a current position of the computing platform 122. The positioning system 134 may be implemented by any location sensing device or technology. For example, the positioning system may include a GPS unit, or systems that use time-of-arrival, direction-of-arrival, triangulation, WiFi, RFID, Loran, dead reckoning, or combinations of these or other systems.

The computing platform 122 also includes a user interface 142. The user interface 142 includes a means for receiving input from a user and a means for conveying information to the user. For example, the user interface 142 may include a display, a speaker, a microphone, and/or an input panel that includes a keypad, a touch screen, buttons, or other means by which the user can manually provide input commands or other information. Other types of user interface technology may also be used.

The computing platform 122 also includes navigation applications 132. The navigation applications 132 are software programs that perform certain navigation-related or map-related functions. These navigation applications 132 are stored on an appropriate data storage medium in the computing platform 122. The navigation applications 132 are run when needed. Included among the navigation applications 132 are a route calculation application 136, a route guidance application 140, a map display application 144, a positioning application 148, and a destination selection application 152. Other embodiments may have more or fewer of these applications. Alternatively, in some embodiments, two or more of these applications may be combined.

The computing platform 122 includes one of the compiled database products 110. The compiled database product 110 is stored on a data storage medium 164 in the computing platform 122. The compiled database product 110 is used by the navigation applications 132 to provide navigation-related features. The compiled database product 110 includes information about the roads, intersections, points of interest, regions, and other geographic features in a covered geographic area. The covered geographic area may include one or more metropolitan areas, states, countries, regions, or combinations thereof.

The navigation applications 132 work together and use the compiled database product 110 to provide various kinds of navigation functions. As an example, the navigation applications may be used for obtaining a route to a desired destination. According to this example, a user may enter a destination using the user interface 142 and, in response, the destination selection application 152 finds the desired place. The starting point for the route is assumed to be the location of the user, which is determined by the positioning application 148 in conjunction with the positioning system 134. Alternatively, the user may also enter the starting point using the user interface 142. Data indicating the location of the desired destination and the location of the starting point are forwarded to the route calculation application 136.

The route calculation application 136 determines a route from the starting point to the destination. As part of determining the route, the route calculation application 136 also calculates a distance of the route by adding the distances of the road segments that comprise the route from the starting point to the desired destination. The route calculation application 136 then forwards data representing the route to the route guidance application 140. The route guidance application 140 generates appropriate directions for the user to follow the route.

When the computing platform 122 is being used to guide the user along a route to a destination, it can be useful to show the user a graphical map of the area in which the user is located. The map display application 144 can be used for this purpose. The map display application 144 receives the data representing the route from the route calculation application 136 and data indicating the user's current position from the positioning application 148. The map display application 144 accesses data from the compiled database product 110 for generating a graphical map image of the geographic area around the user's current position. The map display application 144 renders an image on a display screen of the computing platform 122 showing the geographic area around the user's current position. The image may show the roads located in the vicinity of the user. An indicator mark may be superimposed on the image to indicate the user's current position. Also, the route that the user should follow may be indicated on the image by highlighting.

III. Formation of a Similar Name Priority Ranking List

Figure 5:
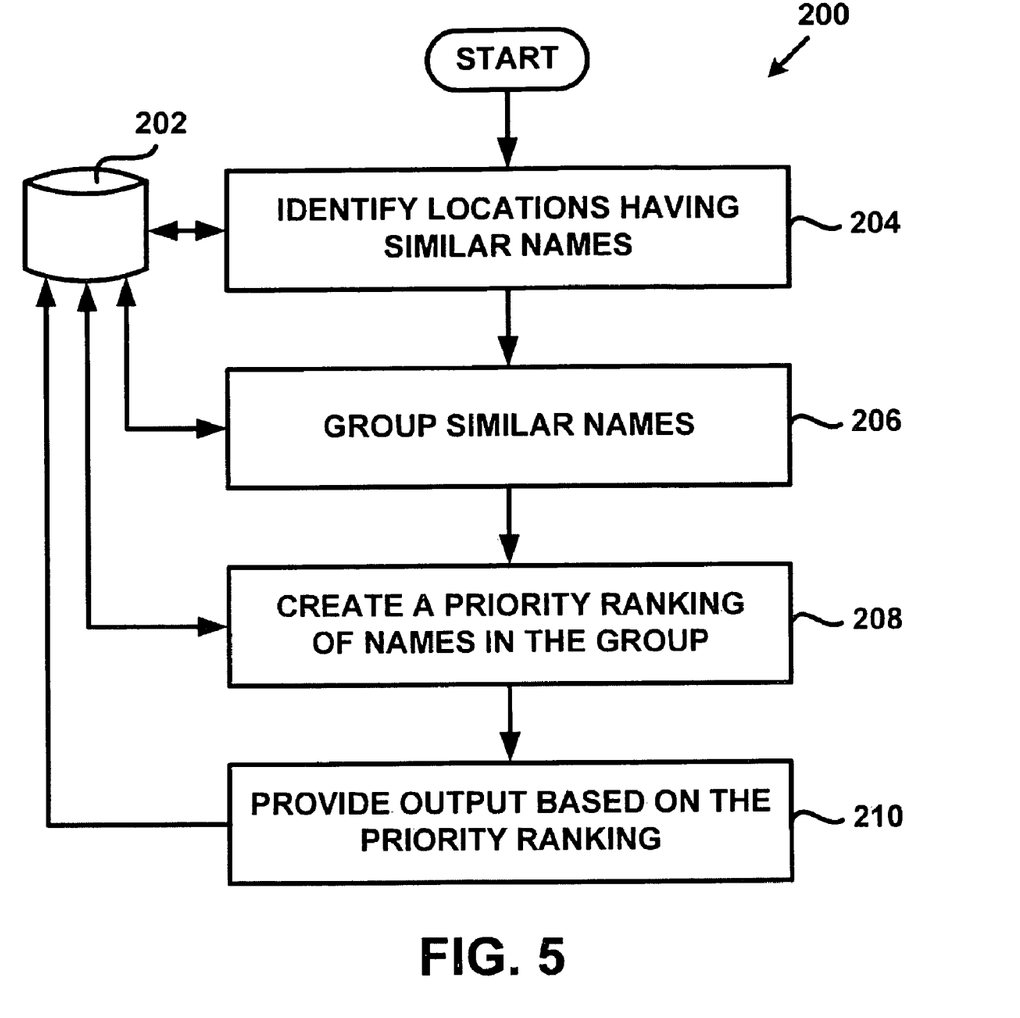
FIG. 5 is a flowchart of a process of prioritizing locations having a similar name, according to an example.

FIG. 5 shows a process 200 of prioritizing locations having a similar spelling or sounding name. The process 200 may be part of the compilation process performed by the compiler 111 (in FIG. 1) when forming a map database product 110 that is used in the computing platforms 122. The process 200 uses data from a source database 202. The source database 202 may be the master geographic database 100 or a database derived from the master geographic database 100, such as the compiled database product 110. The process 200 uses data from the source database 202 as an input and provides an output in the form of a ranking that prioritizes the similarly named locations. This output is stored as data (e.g., an attribute) of the named places in the source database 202.

At block 204, the process 200 identifies locations having the same or a similar name. The names may have the same or similar spelling and/or pronunciation. For example, the city name of "Arlington" is found in many states, such as Illinois, Texas, and Virginia. Additionally, a portion of the names may have the same or similar spelling and/or pronunciation. For example, the city of Arlington Heights and the point of interest Arlington Park are both found in Illinois. As another example, Chicago, Chicago Heights, Chicago Ridge, North Chicago, and West Chicago are also all found within the state of Illinois.

At block 206, the similarly spelled and/or pronounced names are grouped together. Using the previous example, all of the names that include "Arlington" are placed in one group, while all of the names that include "Chicago" are placed in another group. The process 200 may prevent certain words from being used to create groups. For example, the process 200 may not create groups for names that include direction, such as north, south, east, and west. In this example, North Chicago and West Chicago would be listed in the "Chicago" group, but not in a group of names for "North" or "West."

The identification process at block 204 and the grouping process at block 206 may be conducted manually or automatically by comparing name spelling and/or phonemes, and grouping the similarly spelled and/or pronounced names into groups. For example, the map developer 101 may identify similar names by adding a code to a database field in the master geographic database 100. The code indicates to which group the name belongs. As another example, the compiler 111 may group the names during the compiling process. As yet another example, the groups may have been previously formed for another purpose and the process 200 uses these predefined groups.

While FIG. 5 depicts the grouping function occurring after the identification function, it is understood that the identification and grouping functions may work together in a repetitive manner. For example, when a name is identified as having a characteristic of a group, the process 200 may add the name to the group before identifying the next name belonging to a group.

At block 208, the process 200 creates a priority ranking for each group formed at block 206. The priority ranking may be created using one or more factors. The factors may be based on data in the source database 202, such as the number of road segments, population, and administrative levels. The factors may also be based on calculations performed by the computing platform 122 using data from the source database 202. For example, the distance to the destination, which is calculated by the route calculation application 136, may be used as a factor in creating the priority ranking.

In a single factor scenario, the preferred factor is a number of road segments associated with a location. For each of the names in a group, the process 200 accesses the source database 202 to determine the number of road segments associated with the name. In one example, the name having the largest number of associated road segments has the highest priority. The other names in the group are prioritized in descending order; with the name having the smallest number of associated road segments having the lowest priority.

In another example, the process 200 divides the number of road segments associated with each name in the group by the total number of road segments associated with the group to calculate a percentage. In this example, the names are ranked by the percentage of road segments associated with the name. The name having the highest percentage of road segments is ranked first in the group, while the name having the lowest percentage of road segments is ranked last. The remaining names in the group are ranked in descending order between the first and last names based on the percentage of road segments associated with those names.

More than one factor may be used to create a priority ranking of names in a group. In a multiple factor scenario, the number of road segments may be used in combination with other factors, such as population, administrative level, and distance to a given location. Alternatively, factors other than the number of road segments may be used to create the priority ranking. The number and types of factors used to create the priority ranking may depend on what data is available in the source database 202 and the factor's ability to indicate the significance of the location. For example, population data and administrative level data may not be available for all names in a group. As another example, population data may be a better indicator of significance than administrative level data.

Additionally, the factors may be weighted based on the availability of the data for all names in the list and/or the factor's ability to indicate the significance of the location. For example, the number of road segments factor may be weighted heavily in a multiple factor scenario because this factor is available for many names and is a good predictor of significance or importance of a named location. When the factors are weighted, the factors are multiplied by a variable (i.e., a weighting factor) and summed. The sum is then divided by the sum of all weightings to produce a percentage value for each name in the group.

Table 1 ranks the names of three German cities that include "Frankfurt" as part of the name. As seen in Table 1, the number of road segments associated with Frankfurt am Main far exceeds the number of segments associated with either Frankfurt (Oder) or Frankfurt. Table 1 depicts that population data is available for Frankfurt am Main and Frankfurt (Oder), but not Frankfurt. The total segment count and the total population count (as known) are calculated. These totals are then used to calculate a percentage of segments and a percentage of population for each of the cities.

TABLE 1

| Location | Segment Count | Population | % Segments | % Population |
|---|---|---|---|---|
| Frankfurt am Main | 22,484 | 641,076 | 88.1 | 90.1 |
| Frankfurt (Oder) | 3,007 | 70,308 | 11.8 | 9.9 |
| Frankfurt | 20 | | 0.1 | 0 |
| Total: | 25,511 | 711,384 | | |

This data may be used to identify Frankfurt am Main as the most significant or important city of the cities including "Frankfurt" as part of the name. Additionally or alternatively, this data may be used to list the cities in order of priority as depicted in Table 1.

At block 210, the process 200 provides an output based on the priority ranking created at block 208. In one example, the output may be an alphanumeric character indicating a ranking within a group. Using numerals as an example, "Frankfurt am Main" may be assigned the ranking code of "1," "Frankfurt (Oder)" may be assigned the ranking code of "2," and "Frankfurt" may be assigned the ranking code of "3." The ranking codes are stored in the source database 202.

In another example, the output is provided to the user interface 142. In one example, the output is an indication of a single location that is more important than the other locations in a list. Using the data in Table 1, the output at block 210 is "Frankfurt am Main." In another example, the output is a list of names organized by priority. Using the data in Table 1, the output at block 210 is the list:
1. Frankfurt am Main;
2. Frankfurt (Oder);
3. Frankfurt.

The process 200 may use one or more thresholds to determine what output to provide. For example, the threshold may be 70%. In this example, if a named location has more than 70% of the road segments in a group, the name is considered to be significantly more important than the other names in the group. By lowering the threshold to 20%, for example, more than one name in the group may be considered as a significant location.

IV. Use of the Name Prioritization Process

Figure 6:
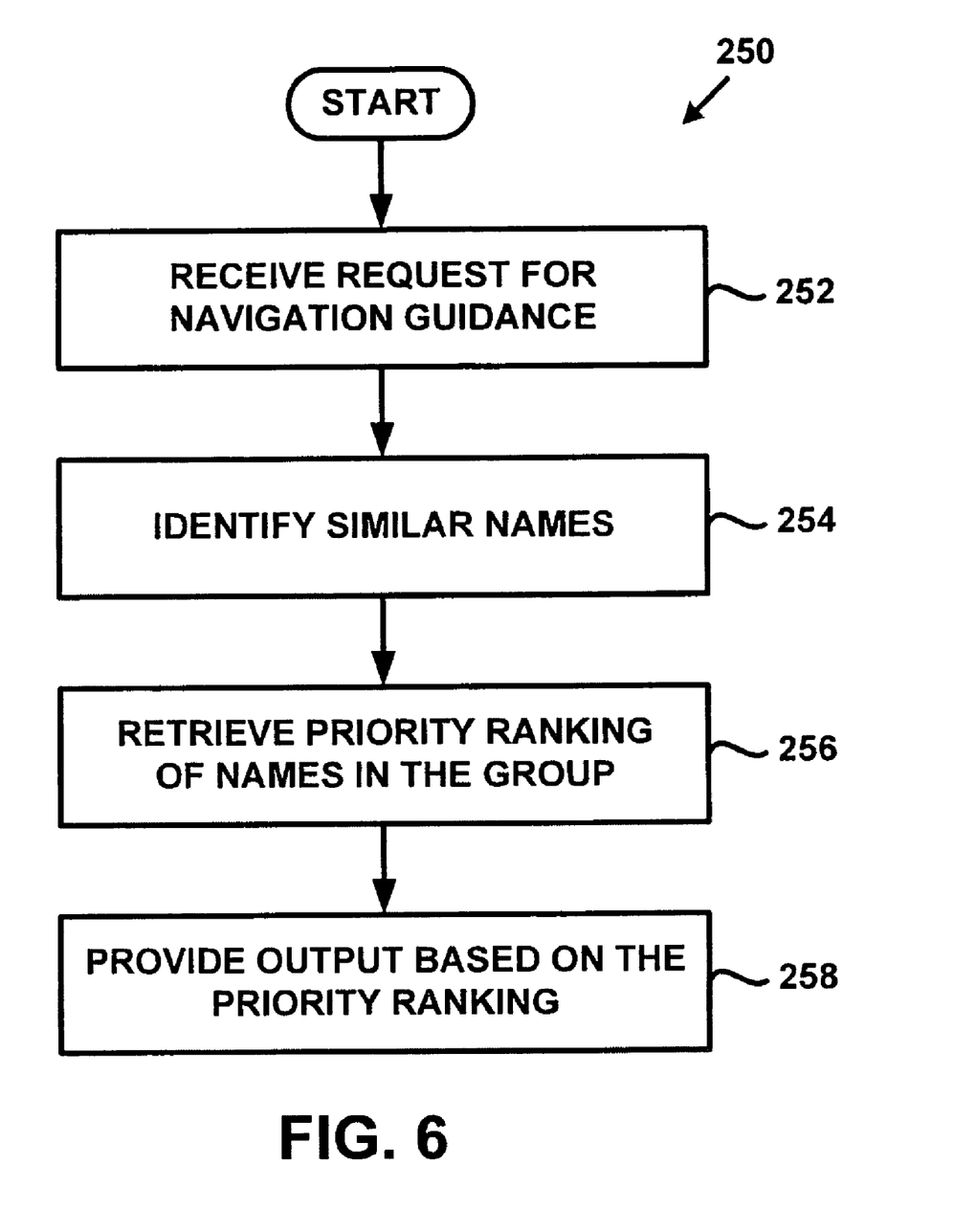
FIG. 6 is a flowchart of a process of destination selection, according to an example.

FIG. 6 is a flowchart of a process 250 of destination selection. At block 252, the computing platform 122 receives a request for navigation guidance. A user may specify a destination to the computing platform 122 using the user interface 142. The user may provide a verbal or mechanical (e.g., using a keyboard or touch screen) input to the user interface 142. The input may be a name of a location. The location may be a geographic area (e.g., state, city, or suburb) or a point of interest. The inputted name may be spelled or pronounced similar to other names or portions of names in the source database 202.

At block 254, the destination selection application 152 identifies that the specified destination has a similar name to other locations in the source database 202 and retrieves the priority ranking of the names in the group at block 256. The identification and retrieval process is performed using the output of the process 200 depicted in FIG. 5. In addition to obtaining the ranking information, the destination selection application 152 may obtain the distance from the user's current position (or entered starting position) and the similarly named locations from the route calculation application 136.

At block 258, the destination selection application 152 provides an output based on the priority ranking. In addition to the priority ranking, the destination selection application 152 may also provide an output based on the distance from the user's current position (or entered starting position) and the similarly named locations. The output of the destination selection application 152, which may be one or more listed names in priority order, is provided to the user interface 142. The user can then confirm whether the first listed name is the desired destination or select the name from the list using the user interface 142. As a result, the user can conveniently select a destination for navigation guidance.

For example, a user may want directions to Frankfurt am Main and, using the user interface 142, specifies "Frankfurt"

as the destination. The destination selection application 152 retrieves Frankfurt am Main (and not Frankfurt) based on the priority ranking within the group containing the word "Frankfurt." The user interface 142 may also provide the complete or partial ranking list to the user. The user may review the ranking list and select the desired destination. The destination selection process is faster due to the priority order of the names on the list.

Alternatively, the user's position may be within a kilometer of Frankfurt and many kilometers away from either Frankfurt am Main or Frankfurt (Oder). In this scenario, "Frankfurt" may be listed before Frankfurt am Main and Frankfurt (Oder) based on the user's location.

The ranking list may also be used by the map display application 144. The map display application 144 may display only the named locations that have a ranking above the threshold level. The map display application 144 may also display additional information for the named locations that have a ranking above the threshold level. Data representing this additional information may be stored in the source database 202. For example, the map display application 144 may overlay demographic information, such as population data, on the map.

Because similarly spelled or pronounced names are prioritized automatically using data available in a geographic database, the navigation system destination selection process is more efficient. In addition to ranking the names more quickly and accurately, a navigation system user can select a destination quicker. Moreover, the user receives navigation guidance to a desired destination despite the fact that the user did not completely provide the destination name to the navigation system.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method of organizing a group of geographic names in a geographic database for use by a navigation system, comprising:
   identifying names of locations in the geographic database that are spelled or pronounced in a similar manner;
   grouping the names with a common similarity;
   prioritizing the names within a group using at least one attribute in the geographic database used by the navigation system, wherein the at least one attribute includes a number of road segments associated with each of the names,
   wherein prioritizing includes using a percentage corresponding to the road segments associated with each of the names to determine at least one name within the group to be considered for display in the navigation system based on whether the respective percentage of road segments is above a threshold, the respective percentage calculated based on the number of road segments associated with the respective name in the group divided by a total number of road segments associated with the group.

2. The method of claim 1 wherein the additional attribute further includes an additional attribute associated with the names.

3. The method of claim 2 wherein the additional attribute is population.

4. The method of claim 2 wherein one or more attributes are weighted based on availability of data in the geographic database.

5. The method of claim 3 wherein one or more are weighted based on an attribute's ability to predict significance of the named locations.

6. A method of providing guidance to a destination with a computing system, comprising:
   receiving input from a user requesting navigation guidance to a destination, wherein the destination has a name that is similar to other destination names;
   providing the user a list of destinations having similar names, wherein the list is ordered based at least in part on a percentage corresponding to road segments associated with each of the names, the respective percentage calculated based on a number of road segments associated with the respective name in the list of destinations divided by a total number of road segments associated with the list of destinations;
   wherein providing the user comprises determining the list based on whether the respective percentage of road segments associated with the respective name is above a threshold;
   receiving a destination selection of one of the names on the ordered list from the user; and
   providing guidance to the user based on the destination selection.

7. The method of claim 6 wherein the list is ordered based on a weighting of the number of road segments and at least one additional attribute associated with the names.

8. The method of claim 7 wherein the at least one additional attribute associated with the names is selected from the group consisting of population, administrative level, and distance to a destination.

9. The method of claim 7 wherein the weighting is based on availability of data in the geographic database.

10. The method of claim 7 wherein the weighting is based on an attribute's ability to predict significance of the named locations.

11. A method of specifying a destination to a navigation system, comprising:
    providing a name for a destination to the navigation system, wherein the name has a characteristic similar to at least one other destination located in a geographic database used by the navigation system;
    receiving at least one name from a group of names having the similar characteristic, wherein the at least one name is prioritized based at least in part on a percentage corresponding to road segments associated with each of the names in the group, the respective percentage calculated based on a number of road segments associated with the respective name in the group divided by a total number of road segments associated with the group;
    wherein receiving the at least one name comprises determining the at least one name within the group to be considered for display in the navigation system based on whether the respective percentage of road segments is above a threshold; and
    selecting the destination from the at least one name in the group.

12. The method of claim 11 wherein the similar characteristic includes a common spelling of at least part of the names.

13. The method of claim 11 wherein the similar characteristic includes a common pronunciation of at least part of the names.

14. The method of claim 11 wherein receiving at least one name includes receiving names having an attribute value exceeding a threshold level.

15. The method of claim 14 wherein the threshold level is set for receiving a single name from the group of names having the similar characteristic.

16. The method of claim 2 wherein the additional attribute is administrative level code.

17. The method of claim 2 wherein the additional attribute is distance to a destination.

* * * * *